US011030728B2

(12) United States Patent
Samadani et al.

(10) Patent No.: US 11,030,728 B2
(45) Date of Patent: Jun. 8, 2021

(54) TONE MAPPING TECHNIQUES FOR INCREASED DYNAMIC RANGE

(71) Applicant: Apple Inc., Cupertino, CA (US)

(72) Inventors: Ramin Samadani, Menlo Park, CA (US); Gregory B. Abbas, Menlo Park, CA (US); Teun R. Baar, San Francisco, CA (US); Nicolas P. Bonnier, Campbell, CA (US); Victor M. de Araujo Oliveira, San Francisco, CA (US); Zuo Xia, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 38 days.

(21) Appl. No.: 16/127,569

(22) Filed: Sep. 11, 2018

(65) Prior Publication Data
US 2019/0370946 A1 Dec. 5, 2019

Related U.S. Application Data

(60) Provisional application No. 62/677,569, filed on May 29, 2018.

(51) Int. Cl.
*G06T 5/00* (2006.01)
*H04N 5/235* (2006.01)

(52) U.S. Cl.
CPC .......... *G06T 5/009* (2013.01); *H04N 5/2355* (2013.01); *G06T 2207/20081* (2013.01); *G06T 2207/20208* (2013.01); *G06T 2207/30201* (2013.01)

(58) Field of Classification Search
CPC .......... G06T 5/009; G06T 2207/20081; G06T 2207/30201; G06T 2207/20208; H04N 5/2355
See application file for complete search history.

(56) References Cited

U.S. PATENT DOCUMENTS 7,136,073 B2    11/2006  Newman
9,607,658 B2 *  3/2017   Atkins .................. G11B 27/34
(Continued)

OTHER PUBLICATIONS

Seon Joo Kim et al., A New In-Camera Imaging Model for Color Computer Vision and its Application, IEEE Transactions on Pattern Analysis and Machine Intelligence 34.12 (2012): 2289-2302.

*Primary Examiner* — Nhan T Tran
(74) *Attorney, Agent, or Firm* — Treyz Law Group, P.C.; Kendall W. Abbasi (57) ABSTRACT

An electronic device may be provided with a display. A content generator such as a camera may capture images in high dynamic range mode or standard dynamic range mode. The images may have associated image metadata such as face detection information, camera settings, color and luminance histograms, and image classification information. Control circuitry in the electronic device may determine tone mapping parameters for the captured images based on the image metadata. The tone mapping parameters for a given image may be stored with the image in the metadata file. When it is desired to display the image, the control circuitry may apply a tone mapping process to the image according to the stored tone mapping parameters. The algorithm that is used to determine tone mapping parameters based on image metadata may be based on user preference data gathered from a population of users.

17 Claims, 5 Drawing Sheets

(56) References Cited

U.S. PATENT DOCUMENTS

| | | | | |
|---|---|---|---|---|
| 2011/0229019 | A1* | 9/2011 | Batur | G06T 5/002 |
| | | | | 382/159 |
| 2013/0076763 | A1* | 3/2013 | Messmer | G06K 9/00 |
| | | | | 345/506 |
| 2014/0176592 | A1 | 6/2014 | Wilburn et al. | |
| 2015/0245044 | A1* | 8/2015 | Guo | H04N 19/33 |
| | | | | 375/240.03 |
| 2016/0358628 | A1* | 12/2016 | Liu | G06K 9/00765 |
| 2017/0221186 | A1* | 8/2017 | Glotzbach | G06T 7/90 |
| 2017/0339417 | A1* | 11/2017 | Puri | G06K 9/4652 |
| 2018/0350047 | A1* | 12/2018 | Baar | G06T 5/009 |
| 2019/0158793 | A1* | 5/2019 | Oh | G09G 5/10 |

* cited by examiner

TONE MAPPING TECHNIQUES FOR INCREASED DYNAMIC RANGE

This application claims the benefit of provisional patent application No. 62/677,569, filed May 29, 2018, which is hereby incorporated by reference herein in its entirety.

BACKGROUND

This relates generally to electronic devices, and, more particularly, to electronic devices with displays.

Electronic devices often include displays. If care is not taken, display content may not take advantage of the full dynamic range of a display. For example, some electronic devices automatically reduce the dynamic range of high dynamic range images so that the images can be displayed on a standard dynamic range display. When the image is instead displayed on a high dynamic range display, the image may appear dull or may otherwise lack bright whites and dark blacks.

SUMMARY

An electronic device may be provided with a display. A content generator in the electronic device may provide content to be displayed on the display.

A content generator such as a camera may capture images in high dynamic range mode or standard dynamic range mode. The images may have associated image metadata such as face detection information, camera settings, color and luminance histograms, and image classification information.

Control circuitry in the electronic device may determine tone mapping parameters for the captured images based on the image metadata. The tone mapping parameters for a given image may be stored with the image in the metadata file. When it is desired to display the image, the control circuitry may apply a tone mapping process to the image according to the stored tone mapping parameters. The algorithm that is used to determine tone mapping parameters based on image metadata may be based on user preference data gathered from a population of users.

The tone mapping parameters may be used to increase the dynamic range of the image to take advantage of the capabilities of a high dynamic range display. For example, an image captured in high dynamic range mode may undergo an initial tone mapping process that reduces the dynamic range of the image so that it can be displayed on a standard dynamic range display. The tone mapping parameters that the control circuitry determines based on image metadata may be used to reverse some of the initial tone mapping process to increase the dynamic range of the image so that it can be displayed on a high dynamic range display.

DETAILED DESCRIPTION

Figure 1:
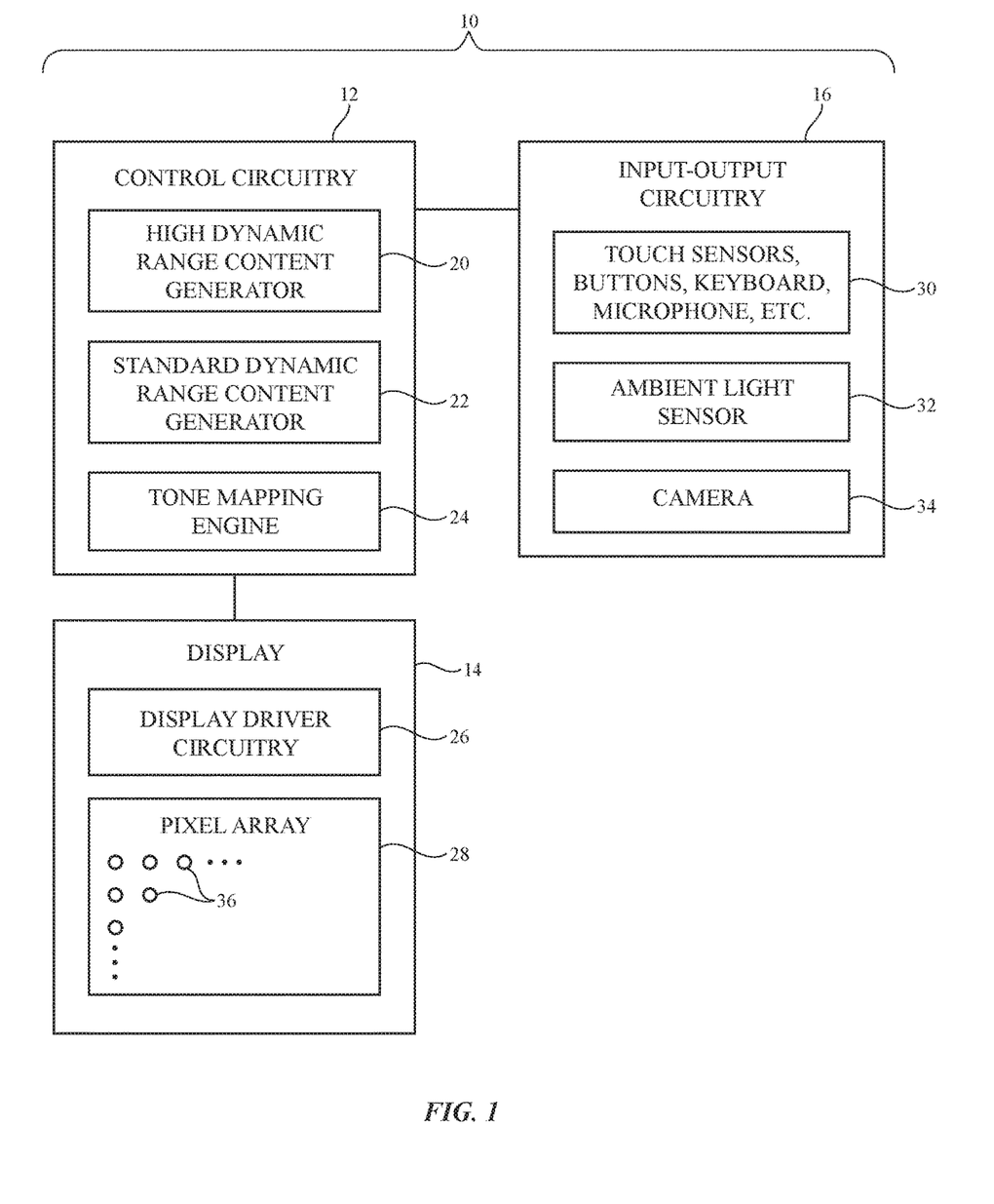
FIG. 1 is a schematic diagram of an illustrative electronic device having a display in accordance with an embodiment.

An illustrative electronic device of the type that may be provided with a display is shown in FIG. 1. As shown in FIG. 1, electronic device 10 may have control circuitry 12. Control circuitry 12 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 12 may be used to control the operation of device 10. The processing circuitry may be based on one or more microprocessors, microcontrollers, digital signal processors, baseband processors, power management units, audio chips, application-specific integrated circuits, graphics processing units, display driver circuitry such as timing controller integrated circuits and other display driver integrated circuits, and other control circuitry.

Control circuitry 12 is configured to execute instructions for implementing desired control and communications features in device 10. For example, control circuitry 12 may be used in determining pixel luminance levels that are to be used in displaying content for a user. Pixel luminance levels may be based, for example, on metadata associated with the content that is being displayed, ambient light conditions, user-adjusted display brightness settings, statistical information associated with content that is being displayed, and display characteristics. Control circuitry 12 may be configured to perform these operations using hardware (e.g., dedicated hardware such as integrated circuits and thin-film circuits) and/or software (e.g., code that runs on control circuitry 12). Software code for performing control and communications operations for device 10 may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 12 during operation of device 10.

Input-output circuitry 16 in device 10 may be used to allow data to be supplied to device 10 from a user or external equipment, may be used to gather environmental data, and may be used to supply data to external equipment and output for a user. Input-output circuitry 16 may include input-output devices 30 such as buttons, joysticks, scrolling wheels, touch pads, key pads, keyboards, microphones, speakers, tone generators, vibrators, cameras, sensors, light-emitting diodes and other status indicators, touch sensitive displays (e.g., touch sensors overlapping pixel arrays in displays), data ports, etc. As shown in FIG. 1, input-output circuitry 16 may include a color ambient light sensor or other ambient light sensor 32 for gathering ambient light measurements (e.g., ambient light levels such as ambient light luminance measurements and/or ambient light color measurements such as color temperature measurements and/or color coordinate measurements).

Input-output circuitry 16 may include one or more image sensors such as camera 34. Camera 34 may be configured to gather image data. Camera 34 may be configured to capture images in standard dynamic range mode and high dynamic range mode. In standard dynamic range mode, camera 34 captures a scene with one exposure. In high dynamic range mode, camera 34 captures a scene with multiple exposures, and the multiple exposures are combined to form a single image. High dynamic range mode enables a larger portion of the dynamic range of a scene to be captured. High dynamic range images generally include brighter whites and darker darks than standard dynamic range images. Capturing high dynamic range images by combining multiple exposures is merely illustrative. If desired, camera 34 may capture images in high dynamic range mode using only one exposure and/or by multiplexing spatial gain.

Device 10 may include one or more internal and/or one or more external displays such as illustrative display 14. Display 14 may be mounted in a common housing with device 10 (e.g., when device 10 is a mobile device such as a cellular telephone, wristwatch device, tablet computer, or laptop computer or when device 10 is an all-in-one device such as a television or desktop computer). In other configurations, display 14 may be coupled to device 10 wirelessly or with a cable (e.g., when device 10 is a desktop computer or a set-top box).

In general, device 10 may be any suitable type of device. Device 10 may, for example, be a computing device laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Device 10 (e.g., a portable device) may be exposed to a variety of environmental conditions. For example, ambient light levels and therefore display glare may vary as a portable device is moved between indoors and outdoors environments (as an example).

Electronic device may have a housing. The housing, which may sometimes be referred to as an enclosure or case, may be formed of plastic, glass, ceramics, fiber composites, metal (e.g., stainless steel, aluminum, etc.), other suitable materials, or a combination of any two or more of these materials. The housing may be formed using a unibody configuration in which some or all of the housing is machined or molded as a single structure or may be formed using multiple structures (e.g., an internal frame structure, one or more structures that form exterior housing surfaces, etc.). In laptop computers and other foldable devices, a first portion of the housing may rotate relative to a second portion of the housing (e.g., a display housing in a laptop computer may rotated about a hinge axis relative to a base housing in the laptop computer).

Display 14 may be mounted in the housing. Display 14 may have a rectangular outline and be surrounded by four peripheral edges, may have a shape that is circular or oval, or may have other suitable outlines. Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may have an array 28 of pixels 36 for displaying images for a user (e.g., video, graphics, text, etc.). Display driver circuitry 26 (e.g., thin-film transistor circuitry on display 14 and/or one or more timing-controller integrated circuits and/or other display driver integrated circuits) may be used to display images on pixel array 28. Pixel array 28 may include, for example, hundreds or thousands of rows and hundreds or thousands of columns of pixels 36. To display color images, each pixel 36 may include subpixels of different colors. For example, each pixel 36 may include, red, green, and blue subpixels or subpixels of different colors. By varying the relative intensity of light emitted by each subpixel in a pixel, pixel output color can be adjusted. The color cast (white point) of each pixel can be adjusted by modifying the gain associated with each subpixel.

The pixel array of display 14 may be formed from liquid crystal display (LCD) components, an array of electrophoretic display pixels, an array of plasma display pixels, an array of organic light-emitting diode pixels or other light-emitting diodes, an array of electrowetting display pixels, or pixels based on other display technologies. Display 14 may be backlit with an array of locally dimmable light-emitting diodes or other suitable backlight structures. Display 14 may display images with a standard dynamic range (e.g., images that exhibit a contrast ratio of about 1,000:1 between their brightest and darkest pixel luminance values) and/or may display images with a high dynamic range (e.g., images that exhibit a contrast ratio of about 10,000:1 or more between their brightest and darkest luminance values).

During operation, content generators in device 10 (e.g., cameras, operating system functions, and/or applications running on control circuitry 12) may generate content for display on the pixel array of display 14. As an example, electronic device 10 may include one or more standard dynamic range (SDR) content generators 22 (e.g., games or other code rendering content, content players, etc.) and/or more high dynamic range (HDR) content generators 20 (e.g., games or other code rendering content, content players, etc.). Standard dynamic range content and high dynamic range content may also be generated by camera 34.

To ensure that content is appropriately displayed on display 14, a mapping engine such as tone mapping engine 24 may be used to determine tone mapping parameters (sometimes referred to as luminance value mapping parameters and/or color value mapping parameters) for the content that indicate how to map content luminance values to display luminance values and/or how to map content color values to display color values. Tone mapping engine 24 may provide the appropriate tone mapping parameters for the content to content generators 20 and 22, may store the appropriate tone mapping parameters for the content in device 10 (e.g., in control circuitry 12 or elsewhere in device 10), and/or may directly perform content-luminance-to-display-luminance mapping operations and/or content-color-to-display-color mapping operations on the content. Tone mapping parameters may include a black level, a reference white level, a specular white level, a highlight boost level, a white point, and/or other parameters that define the tone mapping operations needed to appropriately display content on display 14.

Tone mapping engine 24 may be implemented using code running on control circuitry 12 of FIG. 1, control circuitry for display 14 such as display driver circuitry 26, and/or other control circuitry and/or may use hardwired features of the control circuitry in device 10. The tone mapping parameters may be expressed in any suitable format. For example, a black level, a reference white level, a specular white level, and/or a highlight boost level may respectively be a black level in $cd/m^2$, a reference white level in $cd/m^2$, a specular white level in $cd/m^2$ and a highlight boost level in $cd/m^2$.

Figure 2:
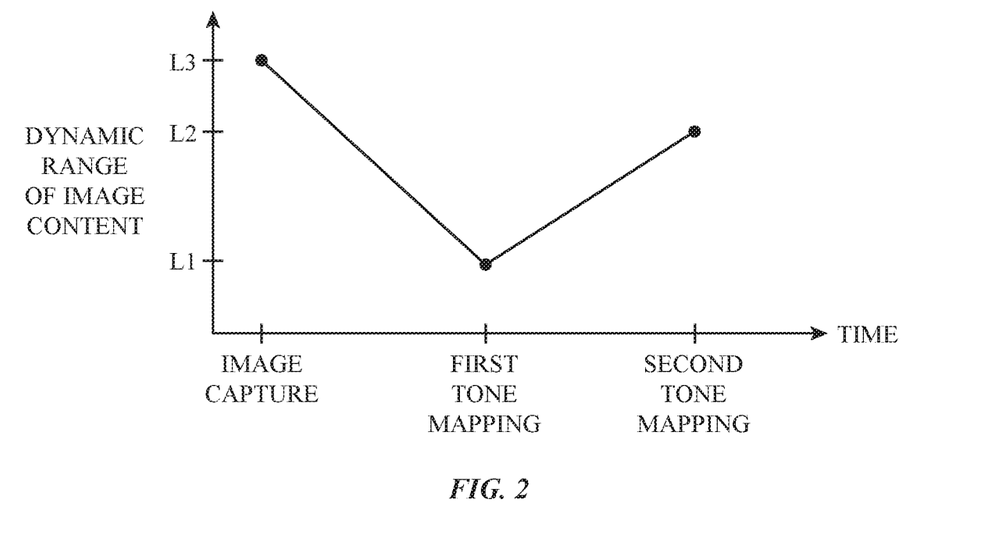
FIG. 2 is a graph showing how the dynamic range of a captured image may be reduced using a first tone mapping process and increased using a second tone mapping process in accordance with an embodiment.

In some arrangements, in may be desirable to use tone mapping engine 24 to increase the dynamic range of content for display 14. FIG. 2 is a graph showing how the dynamic range of an image may be adjusted before being displayed on display 14. As shown in FIG. 2, camera 34 may capture high dynamic range images having a dynamic range value L3. However, not all displays have sufficiently high dynamic range to be able to display high dynamic range images. For example, a display may have dynamic range value L1, which is less than L3. Dynamic range values L1 and L3 may, as an example, be equal to 100 $cd/m^2$ and 600 $cd/m^2$, respectively, or may have other suitable values. To ensure that high dynamic range images captured by camera 34 are appropriately displayed, the images may undergo a first tone mapping process that reduces the dynamic range of the image to value L1 while maintaining local details in the image. The first tone mapping process may be performed using tone mapping engine 24 or may be performed using separate processing circuitry (e.g., image processing circuitry that forms part of camera 34 or other suitable circuitry).

Other displays such as display 14 may have sufficiently high dynamic range to display high dynamic range images. In this type of scenario, tone mapping engine 24 be used to increase the dynamic range of the images from L1 to L2 to take advantage of the full dynamic range of display 14. Because the second tone mapping process "reverses" some or all of the first tone mapping process, the second tone mapping process is sometimes referred to as an inverse tone mapping process.

In the example of FIG. 2, L2 is less than L3. This is, however, merely illustrative. If desired, the second tone mapping process may adjust the dynamic range of the image to a value that is greater than or equal to value L3.

Figure 3:
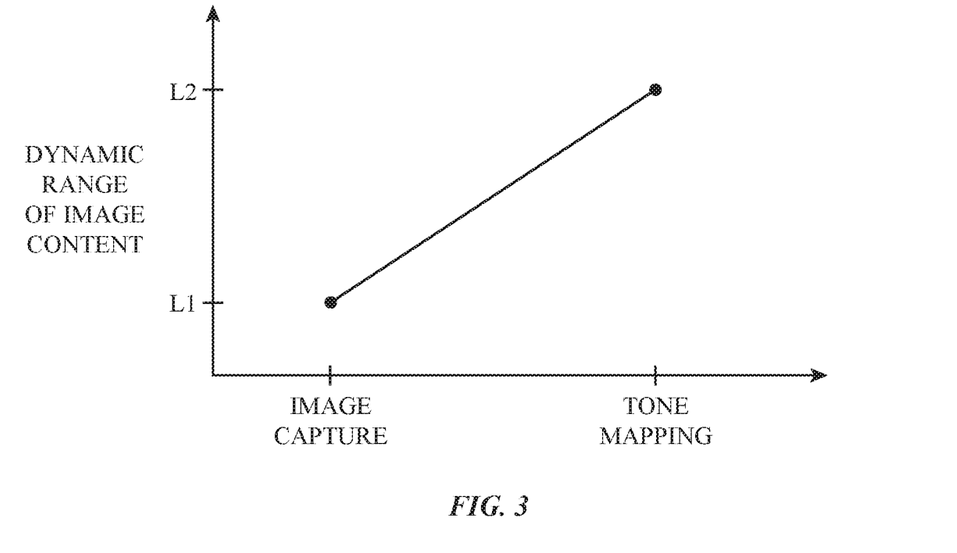
FIG. 3 is a graph showing how the dynamic range of an image may be increased using a tone mapping process in accordance with an embodiment.

FIG. 3 shows another illustrative example of how the dynamic range of an image may be adjusted through tone mapping. In the example of FIG. 3, camera 34 captures a standard dynamic range image having dynamic range value L1. Tone mapping engine 24 may, if desired, be used to apply a tone mapping process that increases the dynamic range of the image from L1 to L2 to take advantage of the high dynamic range capabilities of display 14.

In scenarios of the type described in connection with FIGS. 2 and 3, care must be taken to ensure that tone mapping engine 24 applies the appropriate tone mapping operation when increasing the dynamic range of content such as image content from camera 34. Tone mapping engine 24 may, for example, take into account metadata and/or content statistics associated with the content to select or determine a desired tone mapping curve. For example, images captured by camera 34 such as high dynamic range images and/or standard dynamic range images may have associated metadata embedded therein. Metadata that may be embedded in images captured by camera 34 include camera settings (e.g., lens aperture, focal length, shutter speed, ISO sensitivity, whether flash was used or not), image content information (e.g., color and luminance histograms, whether a face is detected in the image, etc.), image classification information (e.g., snow, concert, landscape, etc.) and/or other metadata. Tone mapping engine 24 may use metadata associated with each image to determine tone mapping parameters for that image. The tone mapping parameters may be written into the image itself (e.g., stored in the image's metadata file), may be stored elsewhere in control circuitry 12, and/or may be applied directly to the image for displaying on pixels 36.

If desired, tone mapping engine 24 may select a desired tone mapping curve based on other information such as display brightness settings (e.g., user defined brightness settings and brightness levels set by device 10 to accommodate a normal power operating mode and a low-power operating mode), ambient conditions (ambient light level and ambient light color), content statistics (e.g., information on average pixel luminance and burn-in risk or other information on operating conditions having a potential impact on display lifetime, quality information, dynamic range information etc.), and display characteristics (e.g., display limitations such as maximum achievable pixel luminance, power constraints (e.g., due to thermal limitations and/or other considerations), whether device 10 is operating on DC power (power from the battery of device 10) or AC power, etc.

Figure 4:
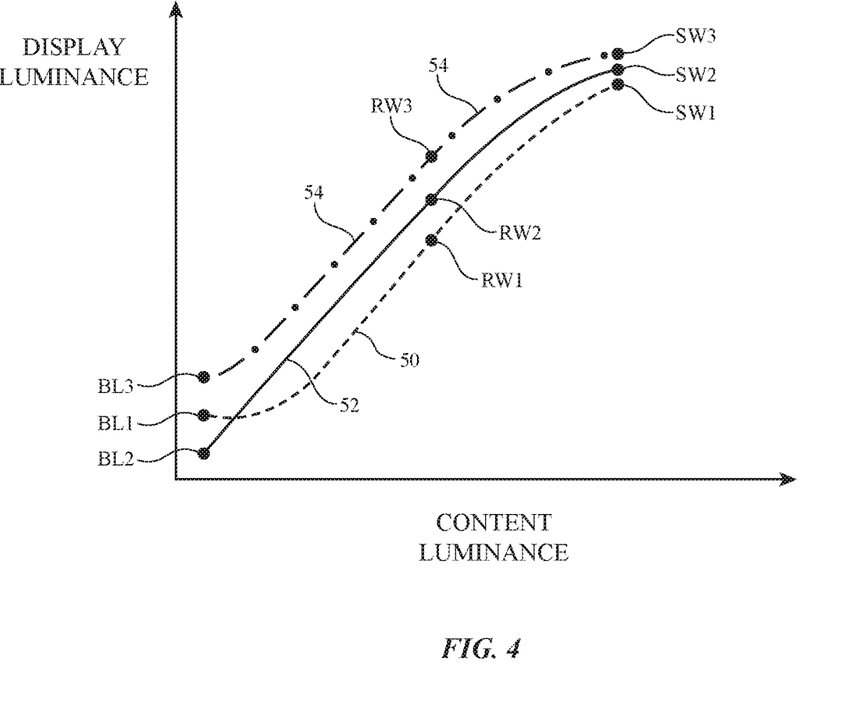
FIG. 4 is a graph showing how content-luminance-to-display-luminance mapping curves may be characterized by tone mapping parameters in accordance with an embodiment.

The use of tone mapping parameters to define content-luminance-to-display-luminance mapping curves is shown in FIG. 4. The content luminance and display luminance axes of the graph of FIG. 4 have logarithmic scales. In the example of FIG. 4, there are three illustrative mapping curves: curve 50, 52, and 54. Each of these curves may be identified using a set of tone mapping parameters such as a black (BL), reference white level (RW), and specular white level (SW). During operation, tone mapping engine 24 may determine which tone mapping parameters are appropriate for a given image based on the metadata associated with that image and the capabilities of display 14. Tone mapping engine 24 may embed the selected tone parameters in the image (e.g., with the image metadata), may store the selected tone parameters elsewhere in control circuitry 12, may provide the tone mapping parameters to display driver circuitry 26, and/or may apply the tone mapping curve associated with the selected tone mapping parameters directly to the image so that it can be displayed on display 14.

If, for example, tone mapping engine 24 selects tone mapping parameters BL1, RW1, and SW1, control circuitry 12 may map content luminance values to display luminance values following curve 50. If tone mapping engine 24 selects tone mapping parameters BL2, RW2, and SW2, control circuitry 12 may map content luminance values to display luminance values following curve 52. If tone mapping engine 24 selects tone mapping parameters BL3, RW3, and SW3, control circuitry 12 may map content luminance values to display luminance values following curve 54. In this way, a set of tone mapping parameters (e.g., three or more tone mapping parameters, three to ten tone mapping parameters, fewer than five tone mapping parameters, etc.) can be used by engine 24 to specify a desired tone mapping relationship for the content generator to follow depending on current operating conditions.

The tone mapping curves and tone mapping parameters of FIG. 4 are merely illustrative, however. There may be greater or fewer than three possible tone mapping curves that may be used to map content luminance values to display luminance values, and any suitable parameter may be used to define such curves. Selecting an appropriate tone mapping curve for an image based on the metadata associated with that image may improve the dynamic range and overall quality of the image when rendered on display 14.

In addition to determining tone mapping parameters for mapping content luminance values to display luminance values, tone mapping engine 24 may, if desired, determine tone mapping parameters for mapping content color values to display color values. Similar to the example of FIG. 4, each set of tone mapping parameters may define an associated tone mapping curve that maps content colors to display colors.

Figure 5:
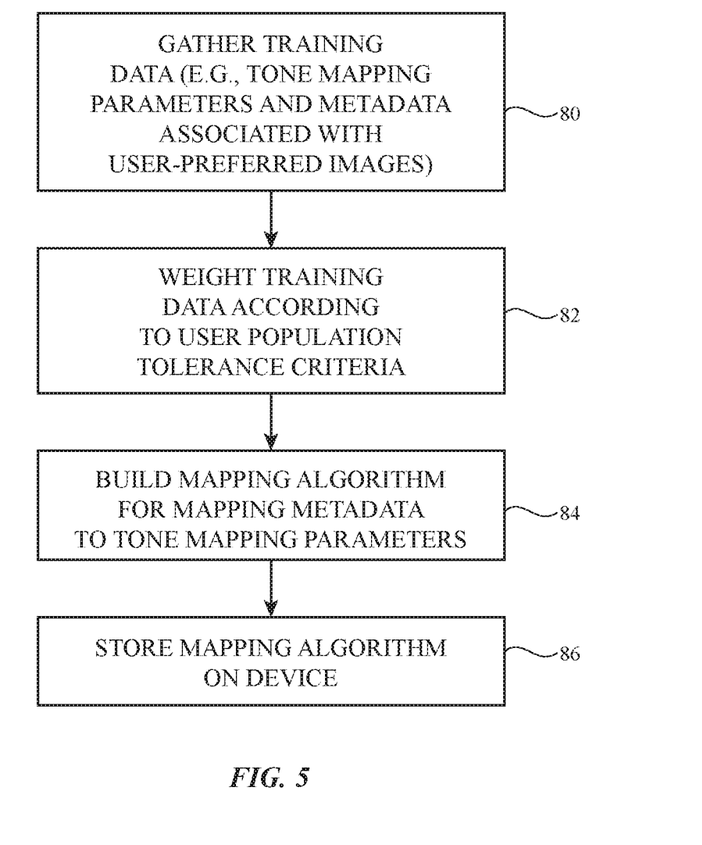
FIG. 5 is a flow chart of illustrative steps involved in building a mapping algorithm for mapping image metadata to tone mapping parameters in accordance with an embodiment.

FIG. 5 is a flow chart of illustrative steps involved in building a mapping algorithm for mapping image metadata to the desired tone mapping parameters. This process may be achieved using calibration computing equipment during manufacturing of device 10.

At step 80, the calibration computing equipment may gather training data from a given population of users. This may include, for example, displaying different images (e.g., on a display such as display 14 and/or a display similar to display 14) for different users and gathering input from the user to determine the user's preferred image. The images may have different image metadata and different tone mapping parameters. The metadata associated with the user-preferred images and the tone mapping parameters that were used to tone map the user-preferred images may be used as training data.

At optional step 82, the calibration computing equipment may weight the training data according to a user population tolerance criteria. This may include, for example, weighting the training data to favor more conservative tone mapping parameters or to favor more extreme tone mapping parameters.

At step 84, the calibration computing equipment may build a mapping algorithm that maps metadata to tone mapping parameters. This may include, for example, applying a linear regression model, a machine learning model, or any other suitable technique for identifying trends in the training data so that predictions can be made based on new data. The result of this model may be a mathematical formula, a look-up table, a matrix, a matrix equation, or any other suitable mapping algorithm that maps image metadata to appropriate tone mapping parameters.

At step 86, the mapping algorithm may be stored in device 10 (e.g., in control circuitry 12). During operation of device 10 (e.g., during image capture and/or during display operations), control circuitry 12 may apply the mapping algorithm to determine tone mapping parameters for an image based on that image's metadata.

Figure 6:
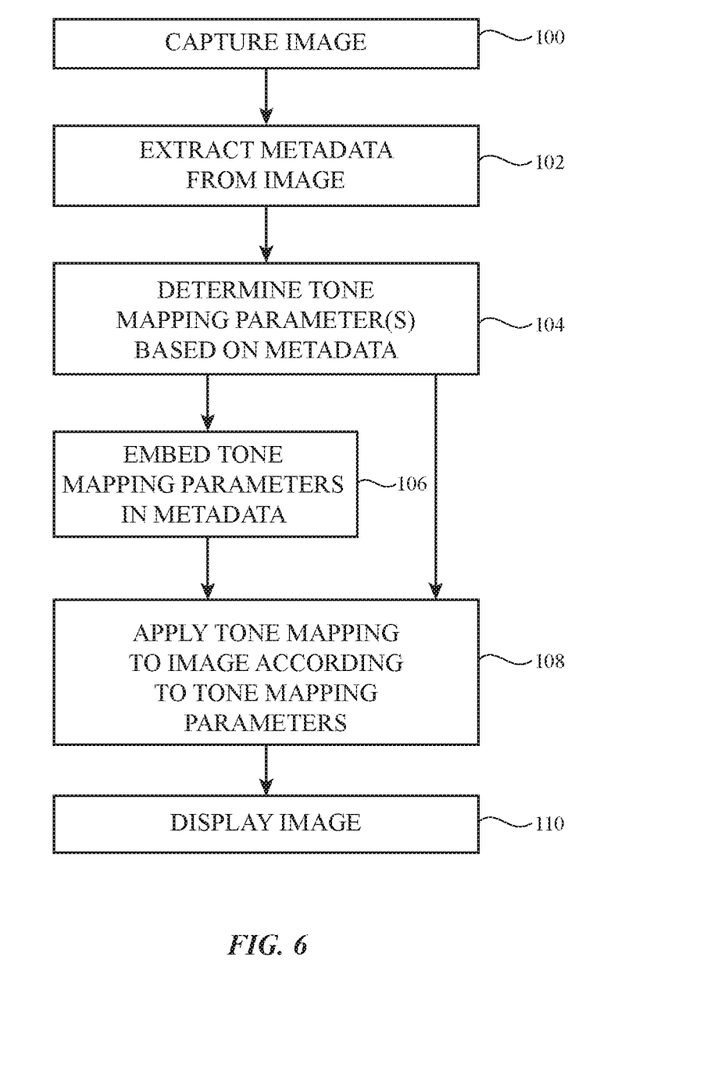
FIG. 6 is a flow chart of illustrative steps involved in operating an electronic device in accordance with an embodiment.

FIG. 6 is a flow chart of illustrative steps involved in operating device 10.

At step 100, camera 34 may capture an image. The image may be a standard dynamic range image created from one exposure or may be a high dynamic range image created from multiple exposures. The image may be a still image or may be associated with video.

At step 102, control circuitry 12 (e.g., tone mapping engine 24 and/or other code running on device 10) may extract metadata from the image captured in step 100. Metadata that may be extracted in step 102 may include camera settings (e.g., lens aperture, focal length, shutter speed, ISO sensitivity, whether flash was used or not, etc.), image content information (e.g., color and luminance histograms, whether a face is detected in the image, etc.), image classification information (e.g., snow, concert, landscape, etc.), and/or other metadata.

At step 104, control circuitry 12 (e.g., tone mapping engine 24 and/or other code running on device 10) may determine appropriate tone mapping parameters for the image based on the extracted metadata. This may include, for example, applying the mapping algorithm built in step 84 of FIG. 5, which maps metadata to tone mapping parameters based on user preference data. This is, however, merely illustrative. If desired, the mapping algorithm that maps metadata to tone mapping parameters may be independent of user preference data. The tone mapping parameters (e.g., a specular white level, a reference white level, a black level, and/or other tone mapping parameters) may define an associated content-luminance-to-display-luminance tone mapping curve as described in connection with FIG. 4 and/or may define an associated content-color-to-display-color tone mapping curve.

At optional step 106, control circuitry 12 (e.g., tone mapping engine 24 and/or other code running on device 10) may embed the tone mapping parameters determined in step 104 in the image as metadata. By tagging the image file with the appropriate tone mapping parameters, the image may be displayed on display 14 at any time without needing to calculate tone mapping parameters at the time of display. This is, however, merely illustrative. If desired, tone mapping parameters may be calculated at the time of display and step 106 may be omitted.

At step 108, control circuitry 12 (e.g., tone mapping engine 24 and/or other code running on device 10) may apply a tone mapping process to the image using the tone mapping parameters determined in step 104. The tone mapping process may, for example, map content luminance values to display luminance values according to a tone mapping curve defined by the tone mapping parameters, as described in connection with FIG. 4. If desired, the tone mapping operations of step 108 may also include mapping content color values to display color values according to a tone mapping curve defined by tone mapping parameters determined in step 104.

As described above, one aspect of the present technology is the gathering and use of data available from various sources to improve the displaying of content. The present disclosure contemplates that in some instances, this gathered data may include personal information data that uniquely identifies or can be used to contact or locate a specific person. Such personal information data can include demographic data, location-based data, telephone numbers, email addresses, home addresses, or any other identifying information.

The present disclosure recognizes that the use of such personal information data, in the present technology, can be used to the benefit of users. For example, the personal information data can be used to display high dynamic range images for a user. Accordingly, use of such personal information data enables calculated control of how content data is mapped to display data. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of gathering image metadata, the present technology can be configured to allow users to select to "opt in" or "opt out" of participation in the collection of personal information data during registration for services. In another example, users can select not to provide location information for image capture operations. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, image metadata can be gathered by inferring preferences based on non-personal information data or a bare minimum amount of personal information, such as the content being requested by the device associated with a user, other non-personal information available, or publically available information.

The foregoing is merely illustrative and various modifications can be made by those skilled in the art without departing from the scope and spirit of the described embodiments. The foregoing embodiments may be implemented individually or in any combination.

What is claimed is:

1. An electronic device, comprising:
a camera that captures an image having associated image metadata;
a display; and
control circuitry configured to:
apply a first tone mapping to the image;
generate tone mapping parameters for the image using the image metadata, wherein the tone mapping parameters are based on at least one of: whether a face is present in the image and camera settings in the image metadata file;
apply a second tone mapping to the image using the tone mapping parameters;
display the image on the display after applying the second tone mapping.

2. The electronic device defined in claim 1 wherein the camera captures the image in high dynamic range mode.

3. The electronic device defined in claim 1 wherein the first tone mapping reduces a dynamic range of the image before the control circuitry generates the tone mapping parameters.

4. The electronic device defined in claim 3 wherein the second tone mapping increases the dynamic range of the image using the tone mapping parameters.

5. The electronic device defined in claim 1 wherein the control circuitry stores the tone mapping parameters with the image metadata.

6. The electronic device defined in claim 1 wherein the control circuitry uses a mapping algorithm to determine the tone mapping parameters using the image metadata.

7. The electronic device defined in claim 6 wherein the mapping algorithm is based on training data collected from a population of users.

8. The electronic device defined in claim 1 wherein the tone mapping parameters define a tone mapping curve that maps content luminance values associated with the image to display luminance values.

9. An electronic device, comprising:
a camera that captures an image in high dynamic range mode, wherein the image has an associated metadata file; and
control circuitry that:
applies a first tone mapping to the image;
determines tone mapping parameters for the image using the metadata file, wherein the tone mapping parameters are based on at least one of: face detection information and camera settings in the metadata file, and wherein the tone mapping parameters define a tone mapping curve that maps content luminance values to display luminance values; and
applies a second tone mapping to the image using the tone mapping parameters.

10. The electronic device defined in claim 9 wherein the first tone mapping reduces a dynamic range of the image and the second tone mapping increases the dynamic range of the image.

11. The electronic device defined in claim 10 further comprising a display that displays the image after the control circuitry applies the second tone mapping to the image.

12. The electronic device defined in claim 9 wherein the control circuitry determines the tone mapping parameters using a mapping algorithm, wherein the mapping algorithm is based on user preference data gathered from a population of users.

13. A method for operating an electronic device having a camera and control circuitry, comprising:
with the camera, capturing an image in high dynamic range mode, wherein the image has an associated data file with image metadata; and
with the control circuitry:
applying a first tone mapping to the image;
determining tone mapping parameters based on the image metadata, wherein determining the tone mapping parameters based on the image metadata comprises determining the tone mapping parameters based on at least one of: face detection information and camera settings in the image metadata;
storing the tone mapping parameters in the data file; and applying a second tone mapping to the image using the tone mapping parameters.

14. The method defined in claim 13 wherein the tone mapping parameters define a tone mapping curve and wherein applying the second tone mapping to the image comprises applying the tone mapping curve to the image to increase a dynamic range of the image.

15. The method defined in claim 14 wherein the electronic device comprises a display, the method further comprising:
    after applying the tone mapping curve to the image, displaying the image on the display.

16. The method defined in claim 14 wherein the first tone mapping reduces the dynamic range of the image.

17. The method defined in claim 13 wherein determining the tone mapping parameters based on the image metadata comprises applying a mapping algorithm that is based on user preference data gathered from a population of users.

* * * * *